US010351011B2

(12) United States Patent
Kubo et al.

(10) Patent No.: US 10,351,011 B2
(45) Date of Patent: Jul. 16, 2019

(54) ELECTRIC VEHICLE

(71) Applicant: Toyota Jidosha Kabushiki Kaisha, Toyota-shi, Aichi-ken (JP)

(72) Inventors: Kazuki Kubo, Toyota (JP); Kiyohito Machida, Aichi-ken (JP); Tsutomu Kawasaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/861,162

(22) Filed: Jan. 3, 2018

(65) Prior Publication Data

US 2018/0201150 A1    Jul. 19, 2018

(30) Foreign Application Priority Data

Jan. 17, 2017  (JP) .................. 2017-005985

(51) Int. Cl.
| | |
|---|---|
| *B60L 11/18* | (2006.01) |
| *B60L 8/00* | (2006.01) |
| *B60L 50/61* | (2019.01) |
| *B60L 58/13* | (2019.01) |
| *B60L 58/20* | (2019.01) |

(Continued)

(52) U.S. Cl.
CPC .......... *B60L 11/1868* (2013.01); *B60L 8/003* (2013.01); *B60L 50/61* (2019.02); *B60L 58/13* (2019.02); *B60L 58/20* (2019.02); *B60L 58/25* (2019.02); *B60L 2240/545* (2013.01); *F02N 11/0862* (2013.01); *Y02T 10/6217* (2013.01); *Y02T 10/7005* (2013.01); *Y02T 10/7044* (2013.01); *Y02T 10/7066* (2013.01); *Y02T 10/7077* (2013.01); *Y02T 10/7083* (2013.01); *Y10S 903/903* (2013.01)

(58) Field of Classification Search
USPC ........................... 290/16; 320/101, 104, 162
See application file for complete search history.

(56) References Cited

U.S. PATENT DOCUMENTS 5,703,468 A * 12/1997 Petrillo ................. H01M 10/44
                                                  320/101
6,051,954 A *  4/2000 Nagao ..................... F21S 9/032
                                                  320/101
(Continued)

FOREIGN PATENT DOCUMENTS

| JP | 2005-160269 A | 6/2005 |
|---|---|---|
| JP | 2011-109802 A | 6/2011 |

(Continued)

*Primary Examiner* — Pedro J Cuevas
(74) *Attorney, Agent, or Firm* — Dinsmore & Shohl LLP

(57) ABSTRACT

An electric vehicle includes: a rotating electric machine; a photovoltaic cell; a first electricity storage device that is charged with electricity output from the photovoltaic cell; a second electricity storage device that is chargeable with electricity generated by the rotating electric machine, and serves as a power source for generating driving force of the vehicle; and a control device. The control device either prohibits charging the first electricity storage device or lowers an upper limit value of an SOC of the first electricity storage device while the control device is executing second charge control of charging the second electricity storage device with generated electricity generated by the rotating electric machine.

6 Claims, 10 Drawing Sheets

(51) Int. Cl.
  *B60L 58/25* (2019.01)
  *F02N 11/08* (2006.01)

(56) References Cited

U.S. PATENT DOCUMENTS

| | | | | |
|---|---|---|---|---|
| 6,091,228 | A * | 7/2000 | Chady | B60K 6/24 |
| | | | | 320/132 |
| 7,525,286 | B2 * | 4/2009 | Wang | H02J 1/14 |
| | | | | 320/104 |
| 7,934,573 | B2 * | 5/2011 | Fassnacht | B60K 6/48 |
| | | | | 180/65.21 |
| 8,049,367 | B2 * | 11/2011 | Izumi | B60L 11/1868 |
| | | | | 307/10.7 |
| 8,120,308 | B2 * | 2/2012 | Ward | B60L 8/003 |
| | | | | 180/2.1 |
| 8,229,616 | B2 * | 7/2012 | Aridome | B60K 6/445 |
| | | | | 701/22 |
| 8,253,387 | B2 * | 8/2012 | Newhouse | B60L 11/1868 |
| | | | | 320/104 |
| 8,330,427 | B2 * | 12/2012 | Taniguchi | H01M 10/441 |
| | | | | 320/134 |
| 8,912,687 | B2 * | 12/2014 | Kesler | B60L 11/182 |
| | | | | 307/104 |
| 8,933,594 | B2 * | 1/2015 | Kurs | B60L 3/003 |
| | | | | 307/326 |
| 8,946,938 | B2 * | 2/2015 | Kesler | B60L 11/182 |
| | | | | 307/104 |
| 8,981,729 | B2 * | 3/2015 | Machida | H02J 7/04 |
| | | | | 320/104 |
| 9,331,512 | B2 * | 5/2016 | Tsukamoto | H02S 50/00 |
| 9,475,480 | B2 * | 10/2016 | Ishishita | B60L 11/1862 |
| 9,618,954 | B2 * | 4/2017 | Masuda | H01M 10/44 |
| 9,698,607 | B2 * | 7/2017 | Kesler | B60L 11/182 |
| 9,744,858 | B2 * | 8/2017 | Hall | B60L 1/00 |
| 9,821,666 | B2 * | 11/2017 | Maeno | B60K 16/00 |
| 2008/0275595 | A1 * | 11/2008 | Bailey | A01G 25/16 |
| | | | | 700/284 |
| 2009/0102415 | A1 * | 4/2009 | Muchow | F03D 9/007 |
| | | | | 320/101 |
| 2009/0289594 | A1 * | 11/2009 | Sato | G05F 1/67 |
| | | | | 320/101 |
| 2010/0019569 | A1 * | 1/2010 | Izumi | B60L 11/1868 |
| | | | | 307/9.1 |
| 2010/0327818 | A1 * | 12/2010 | Taniguchi | H01M 10/441 |
| | | | | 320/162 |
| 2011/0089887 | A1 * | 4/2011 | Ward | B60L 8/003 |
| | | | | 320/101 |
| 2011/0127958 | A1 * | 6/2011 | Ishishita | B60L 11/1862 |
| | | | | 320/109 |
| 2011/0248667 | A1 * | 10/2011 | Umeoka | B60K 16/00 |
| | | | | 320/101 |
| 2012/0016547 | A1 * | 1/2012 | Aridome | B60K 6/445 |
| | | | | 701/22 |
| 2012/0146572 | A1 * | 6/2012 | Ward | B60L 11/1809 |
| | | | | 320/101 |
| 2012/0299552 | A1 * | 11/2012 | Machida | H02J 7/04 |
| | | | | 320/138 |
| 2013/0335001 | A1 * | 12/2013 | Bianconi | H02J 7/0034 |
| | | | | 320/101 |
| 2014/0236379 | A1 * | 8/2014 | Masuda | H01M 10/44 |
| | | | | 700/297 |
| 2014/0266069 | A1 * | 9/2014 | Deboy | H02J 7/0052 |
| | | | | 320/149 |
| 2015/0077063 | A1 * | 3/2015 | Tsukamoto | H02S 50/00 |
| | | | | 320/134 |
| 2015/0270731 | A1 * | 9/2015 | Adelmann | H02J 7/35 |
| | | | | 320/101 |
| 2015/0291051 | A1 | 10/2015 | Morimoto | |
| 2016/0089986 | A1 * | 3/2016 | Maeno | B60K 16/00 |
| | | | | 320/101 |
| 2017/0070081 | A1 * | 3/2017 | Cher | H02S 40/38 |
| 2017/0155274 | A1 * | 6/2017 | Cher | H02S 40/38 |
| 2018/0313906 | A1 * | 11/2018 | Takahashi | G01R 31/3679 |

FOREIGN PATENT DOCUMENTS

| | | |
|---|---|---|
| JP | 2013-143335 A | 7/2013 |
| JP | 2014-117000 A | 6/2014 |
| JP | 2015-199470 A | 11/2015 |

\* cited by examiner

ELECTRIC VEHICLE

CROSS-REFERENCE TO RELATED APPLICATIONS

This application claims priority to Japanese Patent Application No. 2017-005985 filed on Jan. 17, 2017, which is incorporated herein by reference in its entirety including the specification, drawings and abstract.

BACKGROUND

1. Technical Field

The present disclosure relates to charge-discharge control of first and second electricity storage devices of an electric vehicle, of which the first electricity storage device is chargeable with a photovoltaic cell and the second electricity storage device serves as a power source for generating driving force of the vehicle.

2. Description of Related Art

An electric vehicle equipped with a photovoltaic cell that is installed at a predetermined position of the vehicle, such as on the roof, and converts light energy into electricity is publicly known. Such a vehicle includes, for example, a first electricity storage device that is chargeable with the photovoltaic cell and a second electricity storage device that serves as a power source for generating driving force of the vehicle.

For example, Japanese Patent Application Publication No. 2014-117000 discloses a technology that involves temporarily charging a first electricity storage device with electricity generated h a solar panel installed on an electric vehicle, and when a charging rate of the first electricity storage device has reached or exceeded a specified value, charging a second electricity storage device with electricity from the first electricity storage device.

SUMMARY

Such an electric vehicle can utilize not only the energy stored in the first electricity storage device, but also energy generated using an engine, regenerative energy generated by regenerative braking, etc., as the energy for charging the second electricity storage device. Thus, if the second electricity storage device is continuously charged with the first electricity storage device while the second electricity storage device is also charged with generated energy, regenerative energy etc., the first electricity storage device may reach excessively high temperature and high SOC (State Of Charge) by being charged with the photovoltaic cell. As a result, deterioration of the first electricity storage device may be accelerated.

The present disclosure provides an electric vehicle which includes a first electricity storage device that is chargeable with a photovoltaic cell and a second electricity storage device that serves as a power source for generating driving force, and in which deterioration of the first electricity storage device is suppressed.

An electric vehicle according to an aspect of the present disclosure includes: a rotating electric machine; a photovoltaic cell that converts energy of light into electricity; a first electricity storage device that is charged with electricity output from the photovoltaic cell; a second electricity storage device that is chargeable with electricity generated by the rotating electric machine, and serves as a power source for generating driving force of the vehicle; and a control device that is configured to be able to execute at least one of first charge control of charging the second electricity storage device with electricity from the first electricity storage device, and second charge control of charging the second electricity storage device with generated electricity generated by the rotating electric machine. The control device is configured to either prohibit charging the first electricity storage device or lower an upper limit value of the SOC of the first electricity storage device while the control device is executing the second charge control.

Thus, while the second charge control is executed, the first electricity storage device can be prevented from reaching a high SOC that accelerates deterioration. As a result, deterioration of the first electricity storage device can be suppressed.

In the above aspect, the control device may be configured to prohibit charging the first electricity storage device when a temperature of the first electricity storage device is higher than a threshold value while the control device is executing the second charge control.

Thus, the first electricity storage device can be prevented from reaching a high temperature and a high SOC. As a result, deterioration of the first electricity storage device can be suppressed.

In the above aspect, the control device may be configured to lower the upper limit value of the SOC of the first electricity storage device when the temperature of the first electricity storage device is lower than a threshold value while the control device is executing the second charge control.

Thus, the first electricity storage device can be prevented from reaching a high SOC. As a result, deterioration of the first electricity storage device can be suppressed.

In the above aspect, the electric vehicle may further include an engine coupled to the rotating electric machine, and the control device may be configured to make the rotating electric machine generate electricity using power from the engine while the control device is executing the second charge control.

Thus, the second electricity storage device can be charged with electricity generated by the rotating electric machine while the second charge control is executed.

In the above configuration, the control device may be configured to execute the second charge control on demand from a user.

Thus, when the second charge control is executed on demand from a user, either charging the that electricity storage device is prohibited or the upper limit value of the SOC of the first electricity storage device is lowered, so that deterioration of the first electricity storage device can be suppressed.

In the above aspect, the rotating electric machine may be coupled to a driving wheel, and the control device may be configured to either prohibit charging the first electricity storage device or lower the upper limit value of the SOC of the first electricity storage device, when a difference value obtained by subtracting, from an amount of electricity required to increase an SOC of the second electricity storage device from a current value to an upper limit value, an estimated value of an amount of electricity corresponding to an amount of increase in the SOC that is increased by regenerative energy generated by the rotating electric machine while the electric vehicle travels from a current position to a destination, is smaller than an estimated value of an amount of generated electricity generated by the photovoltaic cell during the travel.

Thus, when the difference value during a travel to a destination is smaller than the estimated value of the amount of generated electricity generated by the photovoltaic cell, the second electricity storage device cannot receive the entire amount of generated electricity generated by the photovoltaic cell during the travel. Therefore, charging the first electricity storage device is prohibited or the upper limit value of the SOC of the first electricity storage device is lowered, so that the first electricity storage device can be prevented from being excessively charged. As a result, deterioration of the first electricity storage device can be suppressed.

The present disclosure can provide an electric vehicle which includes a first electricity storage device that is chargeable with a photovoltaic cell and a second electricity storage device that serves as a power source for generating driving force, and in which deterioration of the first electricity storage device is suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
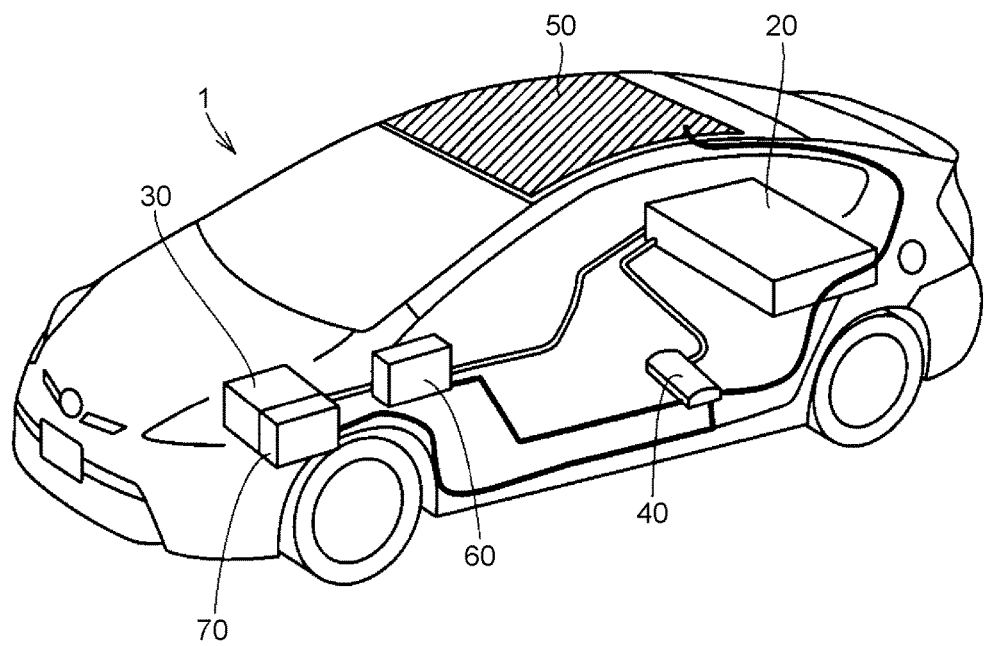
FIG. 1 is a view schematically showing a part of the configuration of an electric vehicle according to an embodiment.

An embodiment of the present disclosure will be described in detail below with reference to the drawings. The same or equivalent parts in the drawings will be denoted by the same reference signs to avoid repeating the same description.

In the following embodiment, a hybrid electric vehicle equipped with an engine and two motor generators will be described as an example of an electric vehicle, but the configuration of the electric vehicle is not limited to that shown in FIG. 1. For example, the electric vehicle may also be an electric automobile or a hybrid electric vehicle having a single motor generator.

FIG. 1 is a view schematically showing a part of the configuration of a hybrid electric vehicle 1 (hereinafter written as the vehicle 1) according to this embodiment. As shown in FIG. 1, the vehicle 1 according to this embodiment includes a battery pack 20, a power control unit (PCU) 30, a solar PCU 40, a solar panel 50, a solar battery 60, and an auxiliary battery 70.

The battery pack 20 is a rechargeable direct-current power source. The battery pack 20 includes, for example, a secondary battery such as a nickel-hydrogen battery or a lithium-ion battery. The battery pack 20 supplies and receives electricity to and from at least one of the two motor generators (hereinafter written simply as the motor generators) (see FIG. 2) to be described later. The electricity of the battery pack 20 is supplied to the motor generator via the PCU 30. The battery pack 20 is charged with electricity generated by the motor generator. Alternatively, the battery pack 20 may be charged with electricity supplied from a power source (not shown) outside the vehicle 1. The battery pack 20 is not limited to a secondary battery, and may instead be a capacitor etc., for example, that can supply and receive direct-current electricity to and from the motor generator. For example, the battery pack 20 is provided at a position lower than a rear seat of the vehicle 1, between wheel houses of right and left rear wheels.

The PCU 30 converts the direct-current electricity from the battery pack 20 into alternating-current electricity and supplies this electricity to the motor generator, or converts regenerative electricity (alternating-current electricity) generated by die motor generator into direct-current electricity and supplies this electricity to the battery pack 20.

For example, the PCU 30 includes a converter and an inverter (neither is shown) each having a plurality of switching elements. These converter and inverter are operated through on-off control of the switching elements. The converter raises the voltage of the direct-current electricity received from the battery pack 20 and outputs this electricity to the inverter. The inverter converts the direct-current electricity output from the converter into alternating-current electricity and outputs this electricity to the motor generator. Thus, the motor generator is driven with the electricity stored in the battery pack 20.

The inverter converts the alternating-current electricity generated by the motor generator into direct-current electricity and outputs this electricity to the converter. The converter lowers the voltage of the direct-current electricity output from the inverter and outputs this electricity to the battery pack 20. Thus, the battery pack 20 is charged with the electricity generated by the motor generator. However, the converter may be omitted.

The PCU 30 further includes a DC-DC converter (not shown) that converts the voltage of the battery pack 20 into a voltage suitable for charging the auxiliary battery 70. The DC-DC converter supplies the converted electricity to the auxiliary battery 70 and thereby charges the auxiliary battery 70.

The solar panel 50 is a photovoltaic cell that converts light energy (e.g., the light energy of sunlight) into direct-current electricity. In this embodiment, the solar panel 50 is installed on a surface of a roof of the vehicle 1 as shown in FIG. 1. The electricity generated by the solar panel 50 is supplied to the solar battery 60 via the solar PCU 40. The solar panel 50 may be disposed on a surface of a place (e.g., hood) other than the roof of the vehicle 1.

The solar battery 60 is an electricity storage device that stores the electricity generated by the solar panel 50. The solar battery 60 is composed of a plurality of (e.g., three) series-connected cells, or of series-connected modules each composed of a plurality of cells. The solar battery 60 is provided at a predetermined position inside the vehicle 1 (e.g., under a center console). The "inside" of the vehicle 1 here includes a space inside the vehicle 1 (e.g., cabin) where occupants are on board, and a space communicating with this space (e.g., luggage compartment).

According to a control signal from an electronic control unit (ECU) 100 (see FIG. 2), the solar PCU 40 converts the direct-current electricity output from the solar panel 50 into electricity with a voltage that can be charged to the solar battery 60, or converts the direct-current electricity from the solar battery 60 into electricity with a voltage that can be charged to the battery pack 20. Specifically, when the state of charge (SOC) of the solar battery 60 has increased to an tipper limit value, the solar PCU 40 charges the battery pack 20 or the auxiliary battery 70 with the electricity from the solar battery 60. On the other hand, for example, when the SOC of the solar battery 60 has decreased to a lower limit value, the solar PCU 40 charges the solar battery 60 with the electricity output from the solar panel 50.

The auxiliary battery 70 supplies electricity to auxiliary loads. Examples of the auxiliary loads include electric devices (e.g., a navigation system 104 (see FIG. 2) and audio equipment (not shown)) provided inside the vehicle 1, and various ECUs installed in the vehicle 1.

Figure 2:
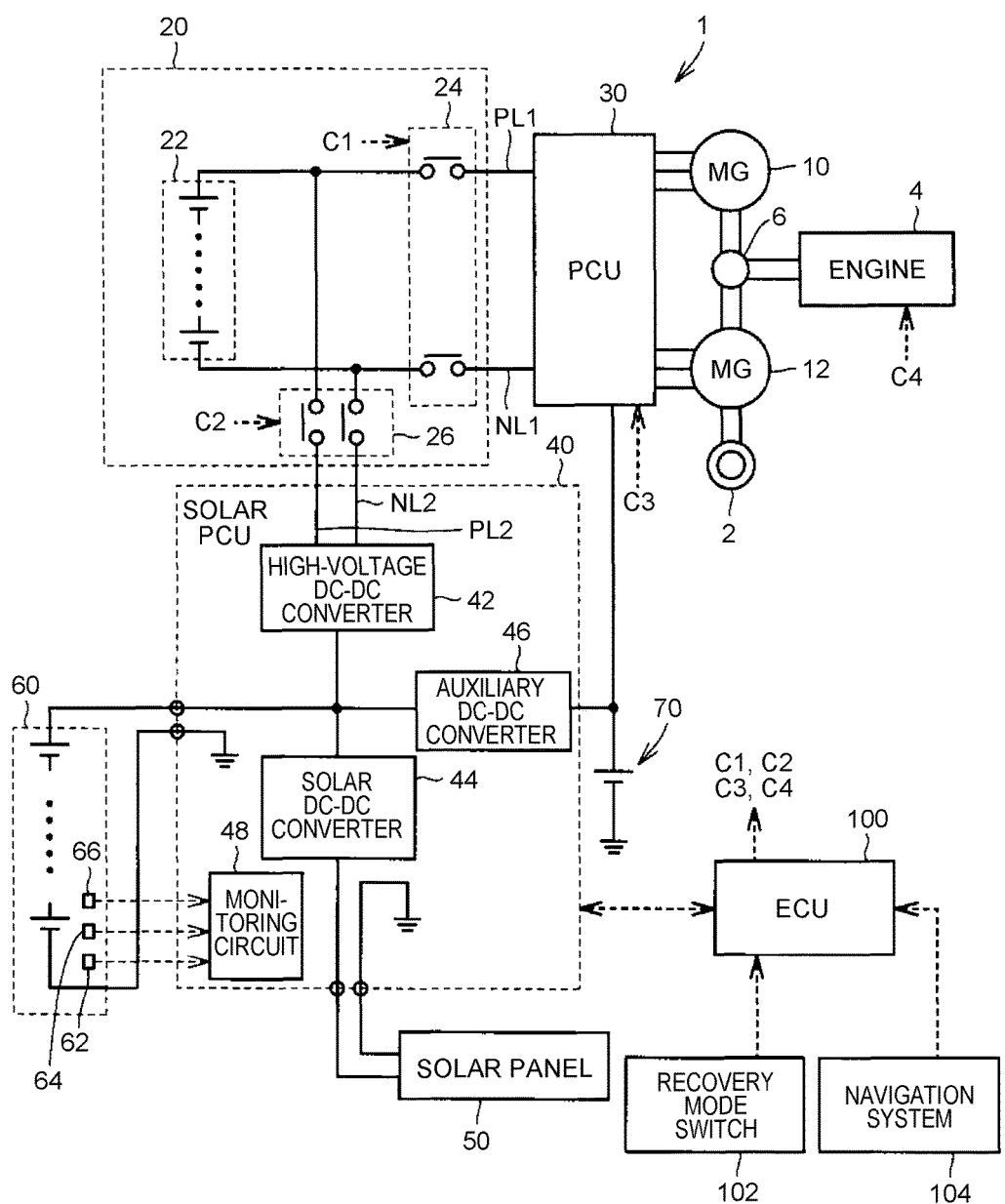
FIG. 2 as a block diagram showing the configuration of devices installed in the electric vehicle according to the embodiment.

In the following, components installed in the vehicle 1 will be described in detail using FIG. 2. FIG. 2 is a block diagram showing the configuration of devices installed in the vehicle 1 according to this embodiment. As shown in FIG. 2, the vehicle 1 further includes a driving wheel 2, an engine 4, a power split device 6, a first motor generator 10 (hereinafter written as the first MG 10), a second motor generator 12 (hereinafter written as the second MG 12), the ECU 100, a recovery mode switch 102, and the navigation system 104.

The vehicle 1 travels using power from at least one of the engine 4 and the second MG 12, The travel mode of the vehicle 1 can be switched between electric vehicle travel (EV travel) of using the power from the second MG 12 without using the power from the engine 4, and a hybrid vehicle travel (RV travel) of using the power from both the engine 4 and the second MG 12.

The engine 4 is an internal combustion engine such as a gasoline engine or a diesel engine. According to a control signal from the ECU 100, the engine 4 generates power for allowing the vehicle 1 to travel. The power generated by the engine 4 is output to the power split device 6.

An output shaft of the engine 4, a rotating shaft of the first MG 10, and a rotating shaft of the second MG 12 are respectively mechanically coupled to rotating elements of the power split device 6.

The power split device 6 is mechanically coupled to the output shaft of the engine 4, the rotating shaft of the first MG 10 and the rotating shaft of the second MG 12, so that torque can be transmitted between the power split device 6 and each of the engine 4, the first MG 10, and the second MG 12. Specifically, the power split device 6 is a planetary gear mechanism. The planetary gear mechanism includes a sun gear, a ring gear, a carrier, and pinion gears as the rotating elements. The plurality of pinion gears are provided around the sun gear that is an external gear so as to each mesh with the sun gear, and the ring gear that is an annulus gear is provided so as to mesh with each of the pinion gears. The pinion gears are held by the carrier so as to be able to rotate and revolve. The sun gear is mechanically coupled to the rotating shaft of the first MG 10. The carrier is mechanically coupled to the output shaft of the engine 4. The ring gear is mechanically coupled to the rotating shaft of the second MG 12. The driving wheel 2 is coupled to the rotating shaft of the second MG 12 through a reduction gear, a differential gear, etc. (not shown).

The first MG 10 and the second MG 12 are, for example, rotating electric machines that are three-phase alternating-current permanent magnet synchronous motors etc. To start the engine 4, the first MG 10 is controlled so as to rotate the output shaft of the engine 4 using electricity from a battery assembly 22. The first MG 10 can also be controlled so as to generate electricity using the power from the engine 4. The alternating-current electricity generated by the first MG 10 is converted into direct-current electricity by the PCU 30 and charged to the battery assembly 22. In some cases, the alternating-current electricity generated by the first MG 10 is supplied to the second MG 12.

The second MG 12 rotates the driving wheel 2 using at least one of the electricity supplied from the battery assembly 22 and the electricity generated by the first MG 10. The second MG 12 can also generate electricity by regenerative braking. The alternating-current electricity generated by the second MG 12 is converted into direct-current electricity by the PCU 30. The converted directed-current electricity is used to charge the battery assembly 22.

The battery pack 20 includes the battery assembly 22, a system main relay (hereinafter written as the SMR) 24, and a charge relay (hereinafter written as the CHR) 26.

The battery assembly 22 is composed of a plurality of series-connected modules that are each composed of a plurality of cells. Alternatively, the battery assembly 22 may be composed of a plurality of series-connected cells. The voltage of the battery assembly 22 is, for example, about 200V.

The SMR 24 is provided on power lines PL1, NL1 that connect the ECU 30 and the battery assembly 22 to each other. The SMR 24 switches between a state where the ECU 30 and the battery assembly 22 are electrically connected to each other (on state) and a state where the PCU 30 and the battery assembly 22 are electrically disconnected from each other (off state), on the basis of a control signal C1 from the ECU 100.

The CHR 26 is provided on power lines PL2, NL2 that are connected to the solar ECU 40 after branching from the power lines PL1, NL1 connecting the battery assembly 22 and the SMR 24 to each other. The CHR 26 switches between a state where the power lines PL1, NL1 and the solar PCU 40 are electrically connected to each other (on state) and a state where the power lines PL1, NL1 and the solar PCU 40 are electrically disconnected from each other (off state), on the basis of a control signal C2 from the ECU 100.

The solar ECU 40 includes a high-voltage DC-DC converter 42, a solar DC-DC converter 44, an auxiliary DC-DC converter 46, and a monitoring circuit 48.

The high-voltage DC-DC converter 42 converts the direct-current electricity from the solar battery 60 into direct-current electricity that can be charged to the battery assembly 22, on the basis of a control signal from the ECU 100. The high-voltage DC-DC converter 42 supplies the converted electricity to the battery assembly 22.

The solar DC-DC converter 44 converts the direct-current electricity supplied from the solar panel 50 into direct-current electricity that can be charged to the solar battery 60, on the basis of a control signal from the ECU 100. The solar DC-DC converter 44 supplies the converted electricity to the solar battery 60.

The auxiliary DC-DC converter 46 converts the direct-current electricity from the solar battery 60 into direct-current electricity that can be charged to the auxiliary battery 70, on the basis of a control signal from the ECU 100. The auxiliary DC-DC converter 46 supplies the converted electricity to the auxiliary battery 70.

The monitoring circuit 48 monitors the state of the solar battery 60. The solar battery 60 is provided with a temperature sensor 62, a voltage sensor 64, and a current sensor 66. The temperature sensor 62 detects the temperature of the solar battery 60 (hereinafter written as the battery temperature) TBs, and sends a signal indicating the detected battery temperature TBs to the monitoring circuit 48. The voltage sensor 64 detects a voltage VBs of the entire solar battery 60, and sends a signal indicating the detected voltage VBs to the monitoring circuit 48. The current sensor 66 detects a current IBs of the solar battery 60 and sends a signal indicating the detected current IBs to the monitoring circuit 48.

The monitoring circuit 48 outputs information on the state of the solar battery 60 to the FEU 100. For example, the monitoring circuit 48 outputs detection results received from the sensors to the ECU 100, or executes a predetermined computation process on the detection results received from the sensors and outputs the processing result to the ECU 100. Specifically, the monitoring circuit 48 calculates the SOC of the solar battery 60 on the basis of the temperature TBs, the voltage VBs, and the current IBs of the solar battery 60, and outputs information indicating the calculated SOC to the ECU 100.

For example, the monitoring circuit 48 may estimate an open circuit voltage (OCV) of the solar battery 60 on the basis of the current IBs, the voltage VBs, and the battery temperature TBs, and estimate the SOC of the solar battery 60 on the basis of the estimated OCV and a predetermined map. Alternatively, for example, the monitoring circuit 48 may estimate the SOC of the solar battery 60 by integrating a charge current and a discharge current of the solar battery 60.

The ECU 100 includes a central processing unit (CPU), a memory that is a storage device, an input-output buffer, etc. (none is shown). The ECU 100 controls various devices so that the vehicle 1 operates in a desired state, on the basis of signals from sensors and devices and of a map and a program stored in the memory. Various modes of control are not limited to being processed by software, but can also be processed by dedicated hardware (electronic circuit).

The ECU 100 acquires the SOC of the solar battery 60 from the monitoring circuit 48. The above-described process of calculating the SOC executed by the monitoring circuit 48 may instead be executed by the ECU 100. When the SOC of the solar battery 60 has reached a lower limit value, the ECU 100 activates the solar DC-DC converter 44 and charges the solar battery 60 with the electricity output from the solar panel 50.

When the SOC of the solar battery 60 has reached the upper limit value, the ECU 100 stops charging the solar battery 60 and turns on the CHR 26. The ECU 100 activates the high-voltage DC-DC converter 42 and charges the battery assembly 22 with the electricity from the solar battery 60. Alternatively, the ECU 100 may charge the battery assembly 22 by activating the solar DC-DC converter 44 in addition to the high-voltage DC-DC converter 42. When the SOC of the solar battery 60 has reached the lower limit value or the SOC of the battery assembly 22 has reached an upper limit value, the ECU 100 deactivates the high-voltage DC-DC converter 42 and turns off the CHR 26, and thereby stops charging the battery assembly 22.

By activating the CHR 26 and the solar PCU 40 as described above, the ECU 100 controls charge and discharge of the solar battery 60 so that the SOC of the solar battery 60 remains within the range between the upper limit value and the lower limit value. This control may be written as the electricity supply control in the following description.

The recovery mode switch 102 and the navigation system 104 are connected to the ECU 100. The recovery mode switch 102 is a manipulation member that is manipulated by a user when demanding a recovery mode to be selected as the control mode of the vehicle 1. When manipulated by the user, the recovery mode switch 102 sends a signal indicating that the recovery mode switch 102 has been manipulated to the ECU 100. If the ECU 100 receives this signal while the recovery mode is not selected, the ECU 100 determines that the user has turned on the recovery mode switch 102. When the ECU 100 has determined that the recovery mode switch 102 has been turned on, the ECU 100 turns on a flag that indicates whether the recovery mode is selected. On the other hand, if the ECU 100 receives this signal while the recovery mode is selected, the ECU 100 determines that the user has turned off the recovery mode switch 102. When the ECU 100 has determined that the recovery mode switch 102 has been turned off, the ECU 100 turns off the flag.

The recovery mode includes a control mode in which, when the engine 4 has been stopped, the engine 4 is started and electricity is generated by the first MG 10 using the power from the engine 4, and the SOC of the battery assembly 22 is increased to a threshold value or higher using the generated electricity. This threshold value may be the upper limit value of the SOC of the battery assembly 22, or a value obtained by adding a predetermined amount to the current SOC. When the SOC of the battery assembly 22 has reached or exceeded the threshold value in the recovery mode, the ECU 100 may stop the engine 4 or keep the engine 4 operating. Alternatively, the recovery mode may be a control mode in which the SOC is increased by the first MG 10 generating a constant amount of electricity until a predetermined time elapses.

On demand from a user, the navigation system 104 determines a travel route to a destination set by the user. While the user is driving the vehicle 1, the navigation system 104 shows guidance (right turn, straight forward, left turn, etc.) corresponding to a current position, on a display device (not shown) provided inside the vehicle 1 so that the vehicle 1 moves along the determined travel route or the travel route set by the user. The navigation system 104 detects the current position of the vehicle 1 the current position identified by latitude and longitude) by a built-in global positioning system (GPS). The navigation system 104 acquires the altitude of the current position, for example, from the current position of the vehicle 1 and map information (including information on the altitude according to the latitude and the longitude). Moreover, the navigation system 104 acquires information on the destination (the latitude, longitude, altitude, etc. of the destination), for example, from the set destination and the map information. Then, the navigation system 104 sends the information on the current position (the latitude, longitude, altitude, etc. of the current position) and the information on the destination to the ECU 100.

The vehicle 1 having such a configuration can utilize not only the energy stored in the solar battery 60, but also the energy generated using the engine 4 and the first MG 10, the regenerative energy generated h regenerative braking in the second MG 12, etc., as the energy for charging the battery assembly 22. Thus, if the battery assembly 22 is continuously charged with the solar battery 60 while the battery assembly 22 is also charged with the generated energy, the regenerative energy, etc., the solar battery 60 may reach excessively high temperature and high SOC by being charged with the solar panel 50. As a result, deterioration of the solar battery 60 may be accelerated.

In this embodiment, therefore, the ECU either prohibits charging and discharging the solar battery 60 or lowers the upper limit value of the SOC of the solar battery 60 while the ECU 100 is executing charge control of charging the battery assembly 22 with the generated electricity generated by the motor generator (the first MG 10 or the second MG 12).

Thus, while the charge control is executed, the solar battery 60 can be prevented from reaching a high SOC that accelerates deterioration. As a result, deterioration of the solar battery 60 can be suppressed.

In this embodiment, the charge control of the battery assembly 22 while the recovery mode is selected (i.e., the charge control of charging the battery assembly 22 with the generated electricity generated by the first MG 10) will be described as an example of the charge control of charging the battery assembly 22 with the generated electricity generated by the motor generator.

Figure 3:
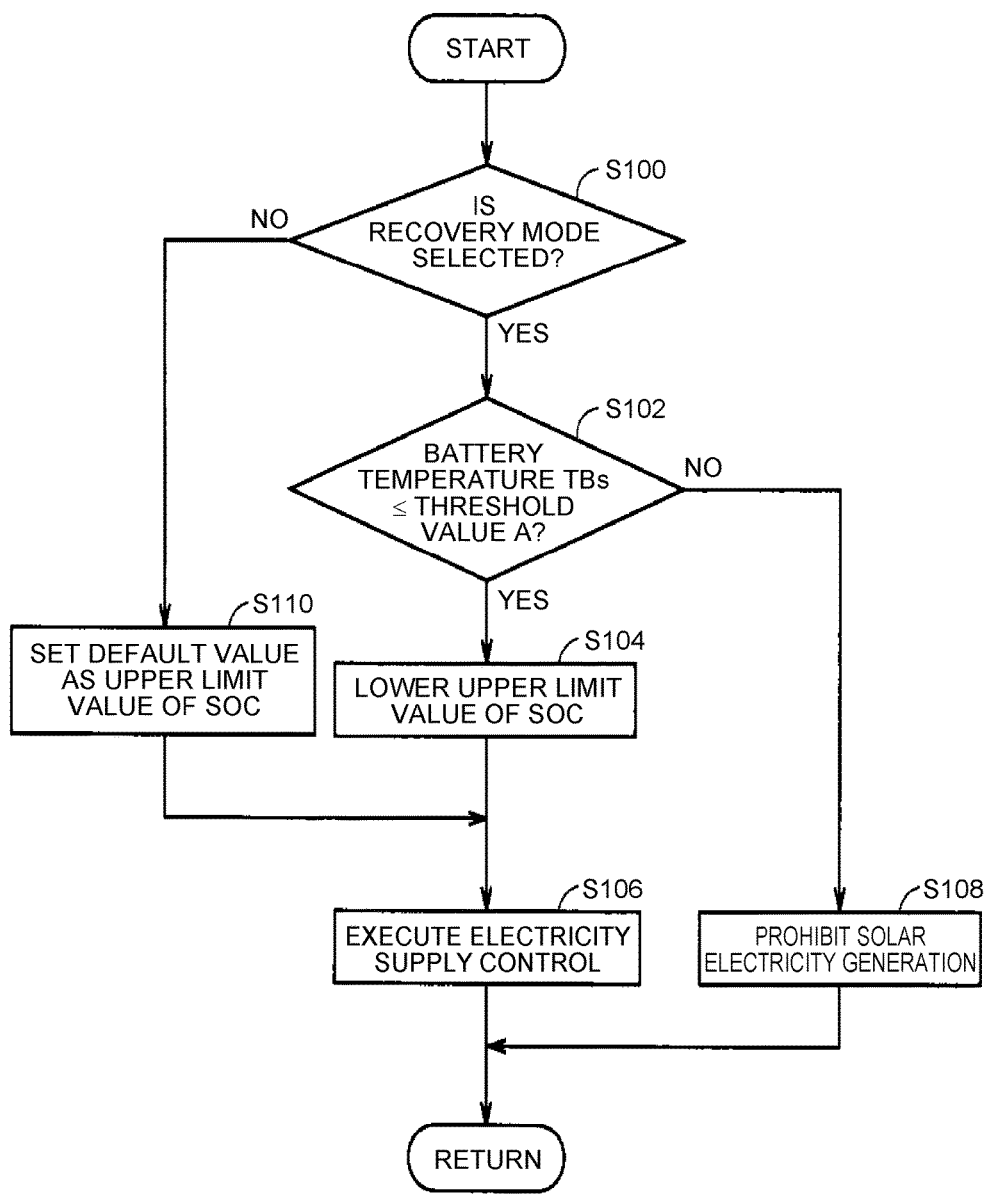
FIG. 3 is a flowchart showing a control process executed by an ECU installed in the electric vehicle according to the embodiment.

In the following, a control process executed by the ECU 100 will be described using FIG. 3. FIG. 3 is a flowchart showing the control process executed by the ECU 100 installed in the vehicle 1 according to this embodiment.

In step (hereinafter a step will be denoted by S) 100, the ECU 100 determines whether the recovery mode is selected. For example, when the above-mentioned flag indicating whether the recovery mode is selected is on, the ECU 100 determines that the recovery mode is selected, and when this flag is off, the ECU 100 determines that the recovery mode is not selected. If the ECU 100 determines that the recovery mode is selected (YES in S100), the ECU 100 moves to S102.

In S102, the ECU 100 determines whether the battery temperature TBs is not higher than a threshold value A. For example, the threshold value A is a threshold value used to determine whether a temperature environment of the solar battery 60 is a high-temperature environment that accelerates deterioration. If the ECU 100 determines that the battery temperature TBs is not higher than the threshold value A (YES in S102), the ECU 100 moves to S104.

In S104, the ECU 100 sets the upper limit value of the SOC of the solar battery 60 to a value SOC_u (1) lower than a default value SOC_n (0). For example, such a value that the solar battery 60 does not reach so high an SOC as accelerates deterioration, even when the solar battery 60 is charged until the SOC reaches the upper limit value in a temperature environment where the battery temperature TBs is not higher than the threshold value A, is set as the value $SOC_{13}$ u (1).

In S106, the ECU 100 executes the above-described electricity supply control of supplying electricity to the battery pack 20 when the SOC of the solar battery 60 has reached the upper limit value, and charging the solar battery 60 with the solar panel 50 when the SOC of the solar battery 60 has reached the lower limit value.

If the battery temperature TBs is higher than the threshold value A (NO in S102), the ECU 100 moves to S108. In S108, the ECU 100 prohibits generation of electricity using the solar panel 50 (hereinafter may also be written as the solar electricity generation). Specifically, the ECU 100 deactivates the solar DC-DC converter 44 and prohibits the solar electricity generation, and thereby prohibits charging the solar battery 60.

If the ECU 100 determines that the recovery mode is not selected (NO in S100), the ECU 100 moves to S110. In S110, the ECU 100 sets the upper limit value of the SOC of the solar battery 60 to the default value SOC_u (0), and moves to S106.

Figure 4:
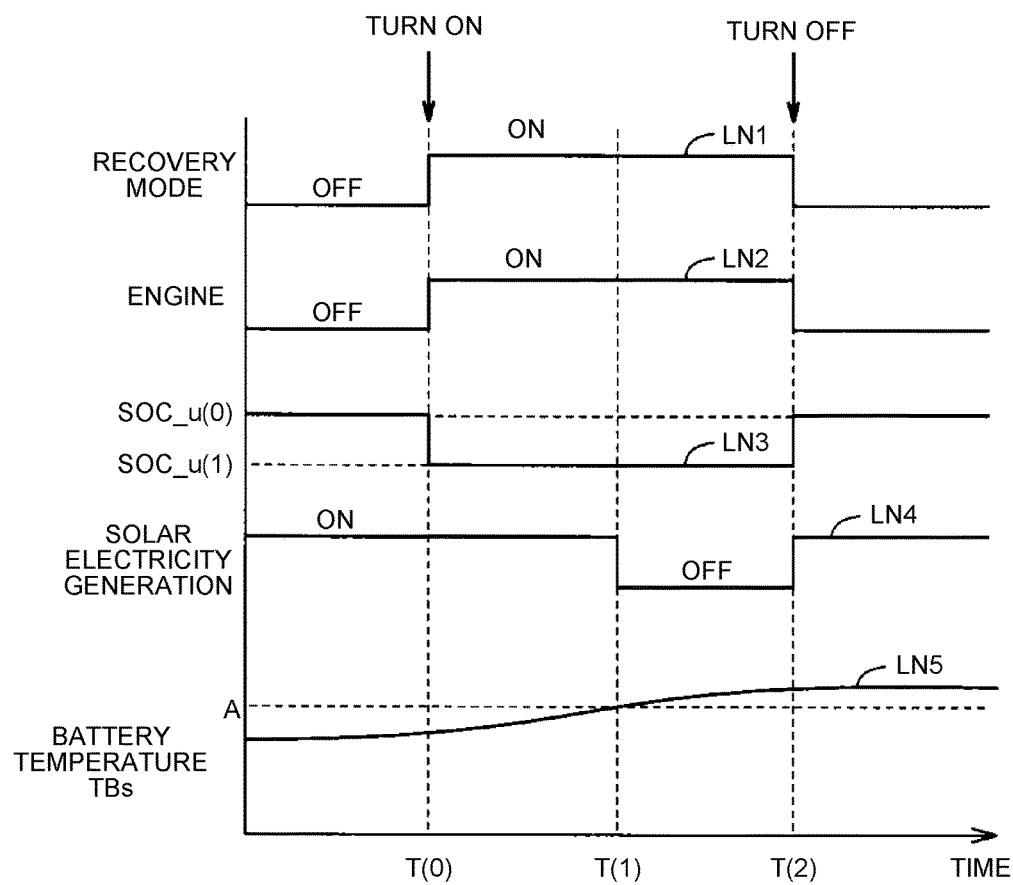
FIG. 4 is a timing chart illustrating operations of the ECU installed in the electric vehicle according to the embodiment.

Operations of the vehicle 1 according to this embodiment based on the above structure and flowchart will be described with reference to FIG. 4. FIG. 4 is a timing chart illustrating operations of the ECU 100 installed in the vehicle 1 according to this embodiment. The horizontal axis in FIG. 4 shows time, and the vertical axis in FIG. 4 shows the state of selection of the recovery mode, the operation state of the engine 4, the upper limit value of the SOC, the state of execution of the solar electricity generation, and the battery temperature TBs. Specifically, the line LN1 in FIG. 4 shows changes in the state of selection of the recovery mode. The line LN2 in FIG. 4 shows changes in the operation state of the engine 4. The line LN3 in FIG. 4 shows changes in the upper limit value of the SOC of the solar battery 60. The line LN4 in FIG. 4 shows changes in the state of execution of the solar electricity generation. The line LN5 in FIG. 4 shows changes in the battery temperature TBs.

For example, a case where the recovery mode is not selected and the vehicle 1 is travelling in the EV travel mode with the engine 4 stopped will be assumed. Moreover, the battery temperature TBs is assumed to be lower than the threshold value A.

In this case, as shown by the line LN1 in FIG. 4, the recovery mode is not selected (NO in S100), so that, as shown by the line LN3 in FIG. 4, the default value SOC_u (0) is set as the upper limit value of the SOC of the solar battery 60 (S110), and the electricity supply control is executed (S106). Accordingly, the solar electricity generation is continuously performed as shown by the line LN4 in FIG. 4.

If the user turns on the recovery mode switch 102 at time T (0), the recovery mode is selected (YES in S100) as shown by the line LN1 in FIG. 4. As the recovery mode is selected, the engine 4 is activated as shown by the line LN2 in FIG. 4.

At this point, the battery temperature TBs is lower than the threshold value A (YES in S102) as shown by the line LN5 in FIG. 4, so that the upper limit value of the SOC of the solar battery 60 is lowered from the default value SOC_u (0) to the value SOC_u (1) (S104) as shown by the line LN3 in FIG. 4, and the electricity supply control is executed (S106). As the battery temperature TBs is lower than the threshold value A, the solar electricity generation is continuously performed as shown by the line LN4 in FIG. 4.

If the battery temperature TBs exceeds the threshold value A (NO in S102) at time T (1) as shown by the line LN5 in FIG. 4, the solar electricity generation is prohibited (S108) as shown by the line LN4 in FIG. 4. Accordingly, charging of the solar battery 60 is restricted.

If the recovery mode switch 102 is turned off by operation of the user at time T (2), the recovery mode is unselected (NO in S100) as shown by the line LN1 in FIG. 4. As the recovery mode is not selected (NO in S100), the engine 4 is stopped as shown by the line LN2 in FIG. 4. Moreover, the upper limit value of the SOC of the solar battery 60 is returned to the default value SOC_u (0) (S110), and the electricity supply control is executed (S106). Accordingly, the solar electricity generation is resumed as shown by the line LN4 in FIG. 4.

Thus, according to the vehicle 1 of this embodiment, when the recovery mode is selected on demand from the user, charging the solar battery 60 is prohibited or the upper limit value of the SOC of the solar battery 60 is lowered. This can prevent the solar battery 60 from reaching a high SOC while the recovery mode is selected. As a result, deterioration of the solar battery 60 can be suppressed. It is therefore possible to provide an electric vehicle which includes a first electricity storage device that is chargeable with a photovoltaic cell and a second electricity storage device that serves as a power source for generating driving force, and in which deterioration of the first electricity storage device is suppressed.

If the battery temperature TBs is higher than the threshold value A while the recovery mode is selected, charging the solar battery 60 is prohibited, so that the solar battery 60 can be prevented from reaching a high temperature and a high SOC. As a result, deterioration of the solar battery 60 can be suppressed.

If the battery temperature TBs is not higher than the threshold value A while the recovery mode is selected, the upper limit value of the SOC of the solar battery 60 is lowered, so that the solar battery 60 can be prevented from reaching a high SOC. As a result, deterioration of the solar battery 60 can be suppressed.

Modified examples will be described below. In the above embodiment, the case has been described where it is determined, while the recovery mode is selected, whether to lower the upper limit value of the SOC of the solar battery 60 or to prohibit charging, the solar battery 60 according to the battery temperature TBs detected by the temperature sensor 62. Alternatively, for example, the battery temperature TBs may be estimated on the basis of the temperature of the inside of the vehicle 1, and whether to lower the upper limit value of the SOC or to prohibit charging the solar battery 60 may be determined according to the estimated battery temperature TBs. Or the battery temperature TBs may be estimated on the basis of the temperature around the solar battery 60 (atmospheric temperature), and whether to lower the upper limit value of the SOC or to prohibit charging the solar battery 60 may be determined according to the estimated battery temperature TBs. Or the battery temperature TBs may be estimated on the basis of the outside air temperature, and whether to lower the upper limit value of the SOC or to prohibit charging, the solar battery 60 may be determined according to the estimated battery temperature TBs.

In the above embodiment, the case where one temperature sensor 62 is provided in the solar battery 60 has been described as an example. However, a plurality of temperature sensors 62 may be provided in the solar battery 60. For example, the temperature sensors 62 may be provided respectively in the cells of the solar battery 60, or may be provided in predetermined cells of the solar battery 60 or provided at predetermined intervals in the solar battery 60. In this case, the ECU 100 may detect a highest value of detection results of the temperature sensors as the battery temperature TBs, or detect a mean value of the detection results of the temperature sensors as the battery temperature TBs.

In the above embodiment, the case where the upper limit value of the SOC of the solar battery 60 is lowered when the battery temperature TBs is higher than the threshold value A has been described. Alternatively, for example, not only the upper limit value but also the lower limit value of the SOC of the solar battery 60 may be lowered when the battery temperature TBs is higher than the threshold value A. Thus, it is possible to maintain the amount of electricity stored in the solar battery 60 while suppressing deterioration of the solar battery 60.

In the above embodiment, the case has been described where the upper limit value of the SOC of the solar battery 60 is lowered when the battery temperature TBs is not higher than the threshold value A at a time point when it is determined that the recovery mode is selected, and charging the solar battery 60 is prohibited when the battery temperature TBs is higher than the threshold value A at that time point. However, the present disclosure is not limited to this manner of control. For example, when the battery temperature TBs is not higher than the threshold value A, the ECU 100 may lower the upper limit value of the SOC of the solar battery 60 or prohibit charging the solar battery 60 on the basis of the battery temperature TBs after the electricity supply control is continued far a predetermined time.

Figure 5:
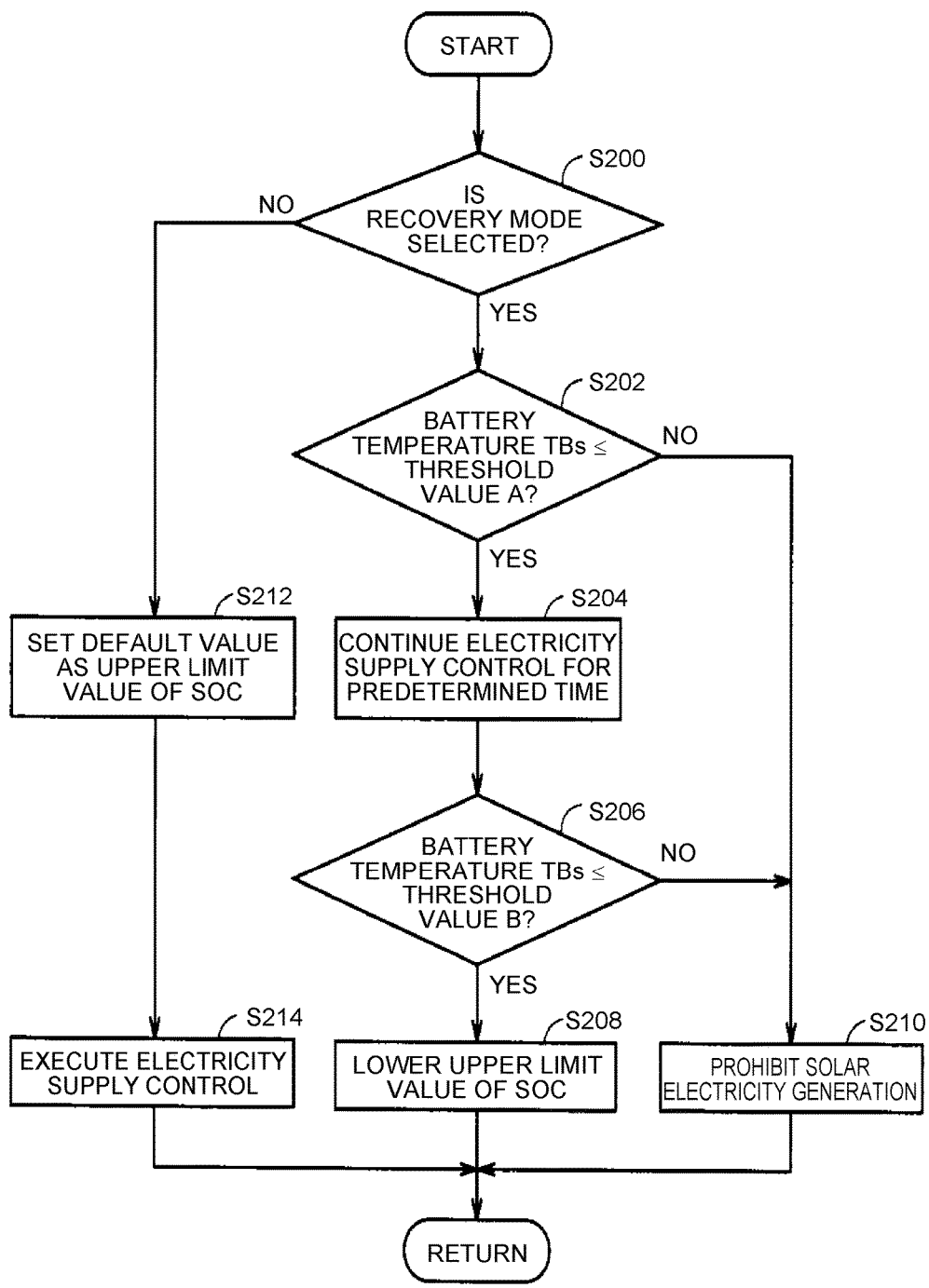
FIG. 5 is a flowchart (No. 1) showing a control process executed by the ECU in a modified example.

In the following, a control process executed by the ECU 100 installed in the vehicle 1 according to this modified example will be described using FIG. 5. FIG. 5 is a flowchart showing the control process executed by the ECU 100 installed in the vehicle 1 according to the modified example.

In S200, the ECU 100 determines whether the recovery mode is selected, If the ECU 100 determines that the recovery mode is selected (YES in S200), the ECU 100 moves to S202.

In S202, the ECU 100 determines whether the battery temperature TBs is not higher than the threshold value A. If the ECU 100 determines that the battery temperature TBs is not higher than the threshold value A (YES in S202), the ECU 100 moves to S204.

In S204, the ECU 100 executes the electricity supply control until a predetermined time elapses. After executing the electricity supply control until a predetermined time elapses, the ECU 100 moves to S206.

In S206, the ECU 100 determines whether the battery temperature TBs is not higher than a threshold value B. The same value as the threshold value A, or a value lower than the threshold value A, may be set as the threshold value B. If the ECU 100 determines that the battery temperature TBs is not higher than the threshold value B (YES in S206), the ECU 100 moves to S208.

In S208, the ECU 100 sets the value SOC_u (1) as the upper limit value of the SOC of the solar battery 60. In S210, the ECU 100 prohibits the solar electricity generation. In S212, the ECU 100 sets the default value SOC_u (0) as the upper limit value of the SOC of the solar battery 60. In S214, the ECU 100 executes the electricity supply control.

Thus, the operation of lowering the upper limit value of the SOC of the solar battery 60 or the operation of prohibiting charging the solar battery 60 can be selected on the basis of the battery temperature TBs after the electricity supply control is executed until a predetermined time elapses. Therefore, an appropriate operation can be selected according to the battery temperature TBs as it changes with time. As a result, deterioration of the solar battery 60 can be suppressed.

Figure 6:
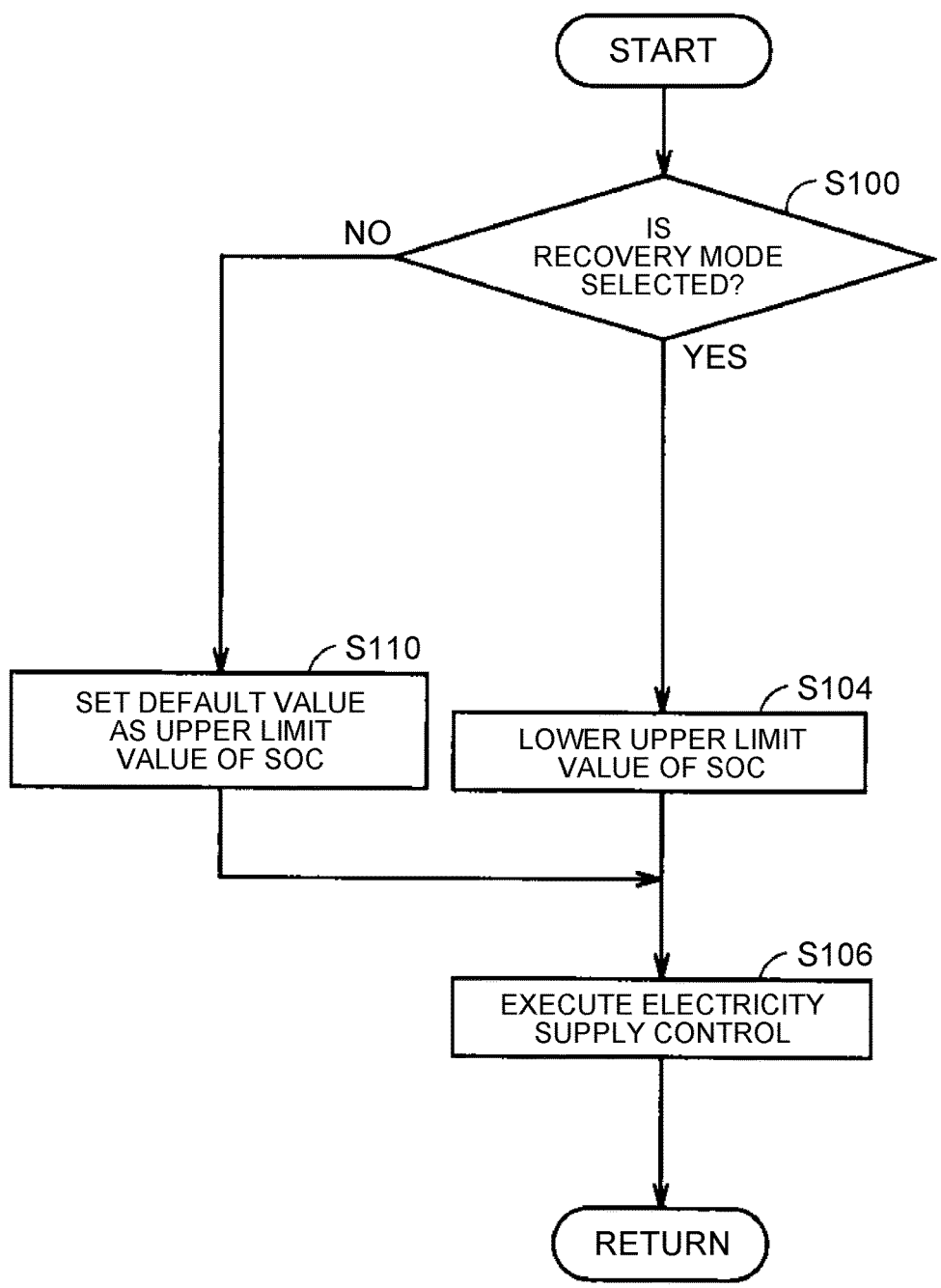
FIG. 6 is a flowchart (No. 2) showing a control process executed by the ECU in a modified example.

In the above embodiment, the case has been described where, while the recovery mode is selected, the upper limit value of the SOC of the solar battery 60 is lowered if the battery temperature. TBs is not higher than the threshold value A, and the solar electricity generation is prohibited if the battery temperature TBs is higher than the threshold value A. Alternatively, while the recovery mode is selected, the upper limit value of the SOC may be lowered regardless of the battery temperature TBs. In this modified example, the ECU 100 executes the processes shown in the flowchart of FIG. 6, for example. The processes of the flowchart shown in FIG. 6 are the same as those of the flowchart shown in FIG. 3, except that the ECU 100 moves to S104 when the recovery mode is selected (YES in S100), and that the process in S102 and the process in S108 are omitted. Therefore, detailed description of the flowchart shown in FIG. 6 will be omitted.

Figure 7:
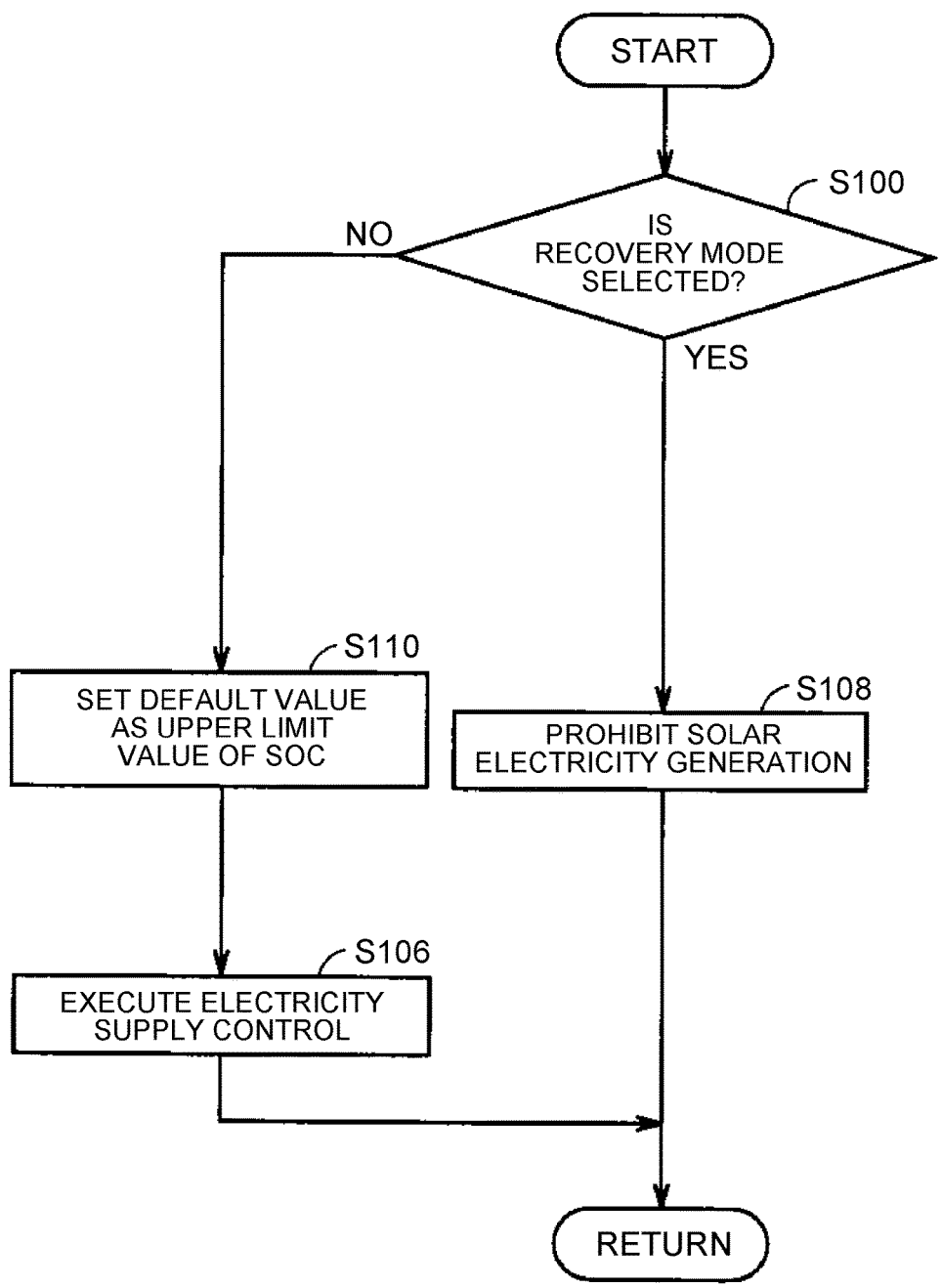
FIG. 7 is a flowchart (No. 3) showing a control process executed by the ECU in a modified example.

Alternatively, while the recovery mode is selected, the solar electricity generation may be prohibited regardless of the battery temperature TBs. In this modified example, the ECU 100 executes the processes shown in the flowchart of FIG. 7, for example. The processes of the flowchart shown in FIG. 7 are the same as those of the flowchart shown in FIG. 3, except that the ECU 100 moves to S108 when the recovery mode is selected (YES in S100), and that the process in S102 and the process in S104 are omitted. Therefore, detailed description of the flowchart shown in FIG. 7 will be omitted.

In the above embodiment, the charge control of the battery assembly 22 while the recovery mode is selected (i.e., the charge control of charging the battery assembly 22 with the generated electricity generated by the first MG 10) has been described as an example of the charge control of charging the battery assembly 22 with the generated electricity generated by the motor generator. However, the present disclosure is not limited to this charge control. For example, the charge control of charging the battery assembly 22 with the generated electricity generated by the motor generator may be charge control of charging the battery assembly 22 by regenerative braking using the second MG 12.

Specifically, the ECU 100 may either lower the upper limit value of the SOC of the solar battery 60 or prohibit charging the solar battery 60 while the ECU 100 is executing the charge control of charging the battery assembly 22 by regenerative braking using the second MG 12.

As an example, a case will be described below where the ECU 100 prohibits charging the solar battery 60 when a difference value obtained by subtracting, from an amount of electricity required to increase the SOC of the battery assembly 22 from a current value to the upper limit value, an estimated value of an amount of electricity corresponding to an amount of increase in the SOC of the battery assembly 22 that is increased by the regenerative energy generated by the second MG 12 while the vehicle 1 travels from a current position to a destination, is smaller than an estimated value of an amount of generated electricity generated by the solar panel 50 during the travel.

Thus, charging the solar battery 60 is prohibited during the travel to the destination, so that charging the solar battery 60 is prohibited also while the charge control of charging the battery assembly 22 by regenerative braking is executed. Therefore, the solar battery 60 can be prevented from reaching a high SOC.

Figure 8:
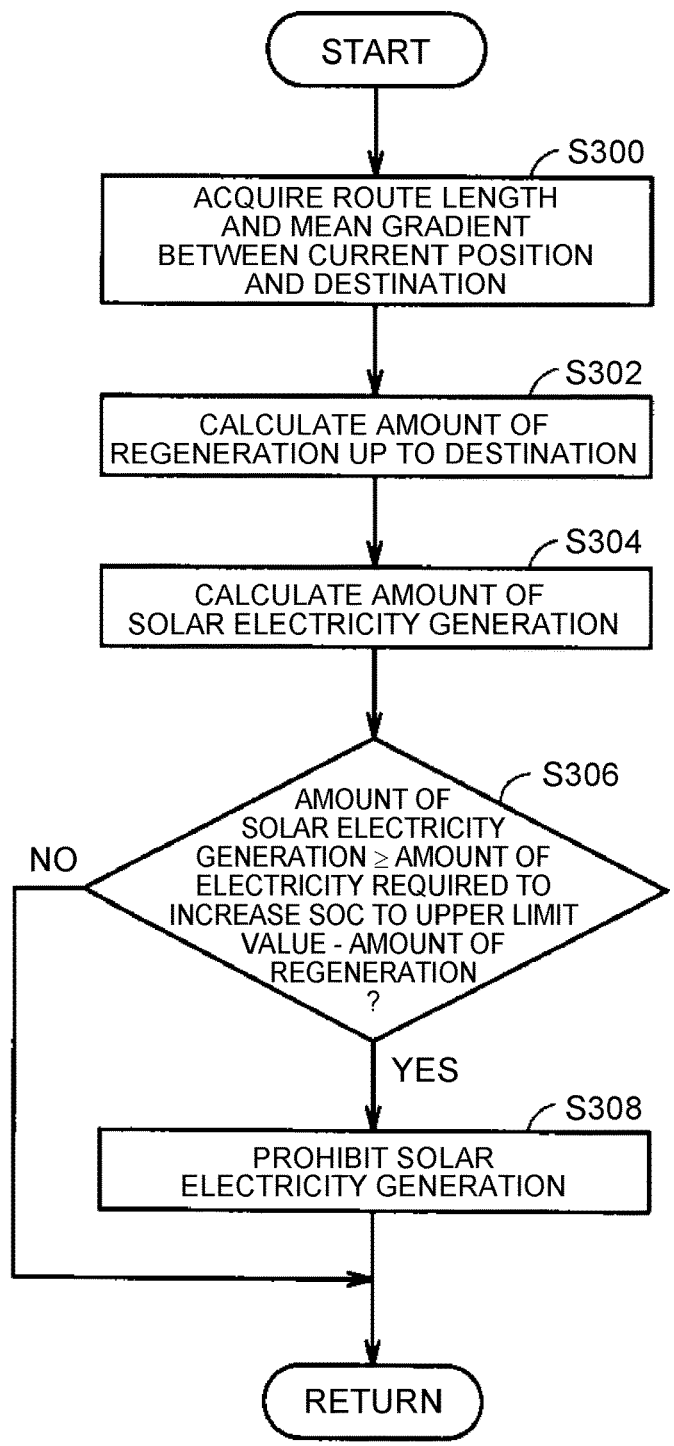
FIG. 8 is a flowchart (No. 4) showing a control process executed by the ECU in a modified example.

In the following, a control process executed by the ECU 100 installed in the vehicle according to this modified example will be described using FIG. 8. FIG. 8 is a flowchart showing the control process executed by the ECU 100 installed in the vehicle according to the modified example. The ECU 100 may repeatedly execute the processes shown in the flowchart of FIG. 8, or may execute these processes each time the destination is changed.

In S300, the ECU 100 calculates a linear distance and a difference in altitude in a horizontal direction from the current position to the destination, from information on the current position and the destination, and calculates approximate values of a mean gradient and a route length from the calculated linear distance and the difference in altitude. For example, the ECU 100 acquires the information on the current position of the vehicle 1 and the information on the destination from the navigation system 104.

In S302, the ECU 100 calculates an estimated value of an amount of regeneration. This amount of regeneration represents an amount of electricity corresponding to an amount of increase in the SOC that is increased by the regenerative energy generated by the second MG 12 while the vehicle 1 travels from the current position to the destination. For example, the ECU 100 calculates the estimated value of the amount of regeneration up to the destination from the calculated approximate values of the mean gradient and the route length. For example, the ECU 100 uses a map, a function, etc. showing a relation among the mean gradient, the route length, and the estimated value of the amount of regeneration, to calculate the estimated value of the amount of regeneration up to the destination from the calculated mean gradient and route length.

In S304, the ECU 100 calculates, an estimated value of the amount of solar electricity generation. Specifically, the ECU 100 calculates a travel duration from an estimated value of a mean speed based on information on the route length, limit speed up to the destination, etc., and calculates an estimated value of the amount of solar electricity generation from a current amount of electricity generated by the solar panel 50 (or an estimated value of mean electricity generated from now) and the calculated travel duration.

In S306, the ECU 100 determines whether the estimated value of the amount of solar electricity generation is not smaller than a difference value obtained by subtracting the estimated value of the amount of regeneration from the amount of electricity required to increase the SOC of the battery assembly 22 to the upper limit value. If the ECU 100 determines that the amount of solar electricity generation is not smaller than the difference value (YES in S306), the ECU 100 moves to S308. In S308, the ECU 100 prohibits the solar electricity generation.

Thus, when the difference value during a travel to a destination is smaller than the estimated value of the amount of generated electricity generated by the solar panel 50, the battery assembly 22 cannot receive the entire amount of generated electricity generated by the solar panel 50 during the travel. Therefore, charging the solar battery 60 is prohibited, so that the solar battery 60 can be prevented from being excessively charged. As a result, deterioration of the solar battery 60 can be suppressed.

Figure 9:
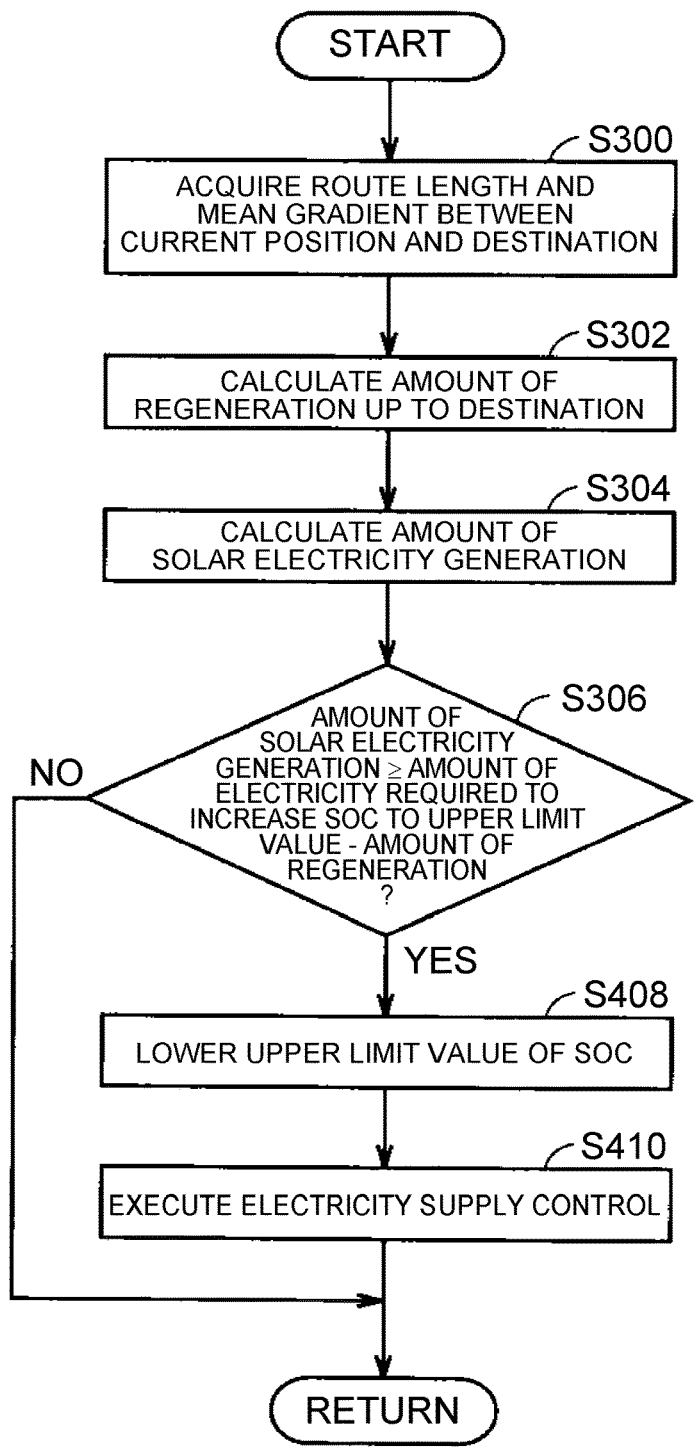
FIG. 9 is a flowchart (No. 5) showing a control process executed by the ECU in a modified example.

In this modified example, the case where the solar electricity generation is prohibited when the difference value is smaller than the estimated value of the amount of generated electricity generated by the solar panel 50 has been described. However, the upper limit value of the SOC of the solar battery 60 may be lowered instead of the solar electricity generation being prohibited. For example, the upper limit value of the SOC of the solar battery 60 may be lowered so that the estimated value of the amount of generated electricity generated by the solar panel 50 does not exceed the difference value, or the upper limit value of the SOC of the solar battery 60 may be lowered by a predetermined value. In this modified example, the ECU 100 executes the processes shown in the flowchart of FIG. 9, for example. The processes of the flowchart shown in FIG. 9 are the same as those of the flowchart shown in FIG. 8, except that the process in S308 is substituted with the process of lowering the upper limit value of the solar battery 60 (S408) and the process of executing the electricity supply control (S410). Moreover, the processes in S408 and S410 are the same as the processes in S104 and S106 of the flowchart shown in FIG. 3. Therefore, detailed description of the flowchart shown in FIG. 9 will be omitted.

Figure 10:
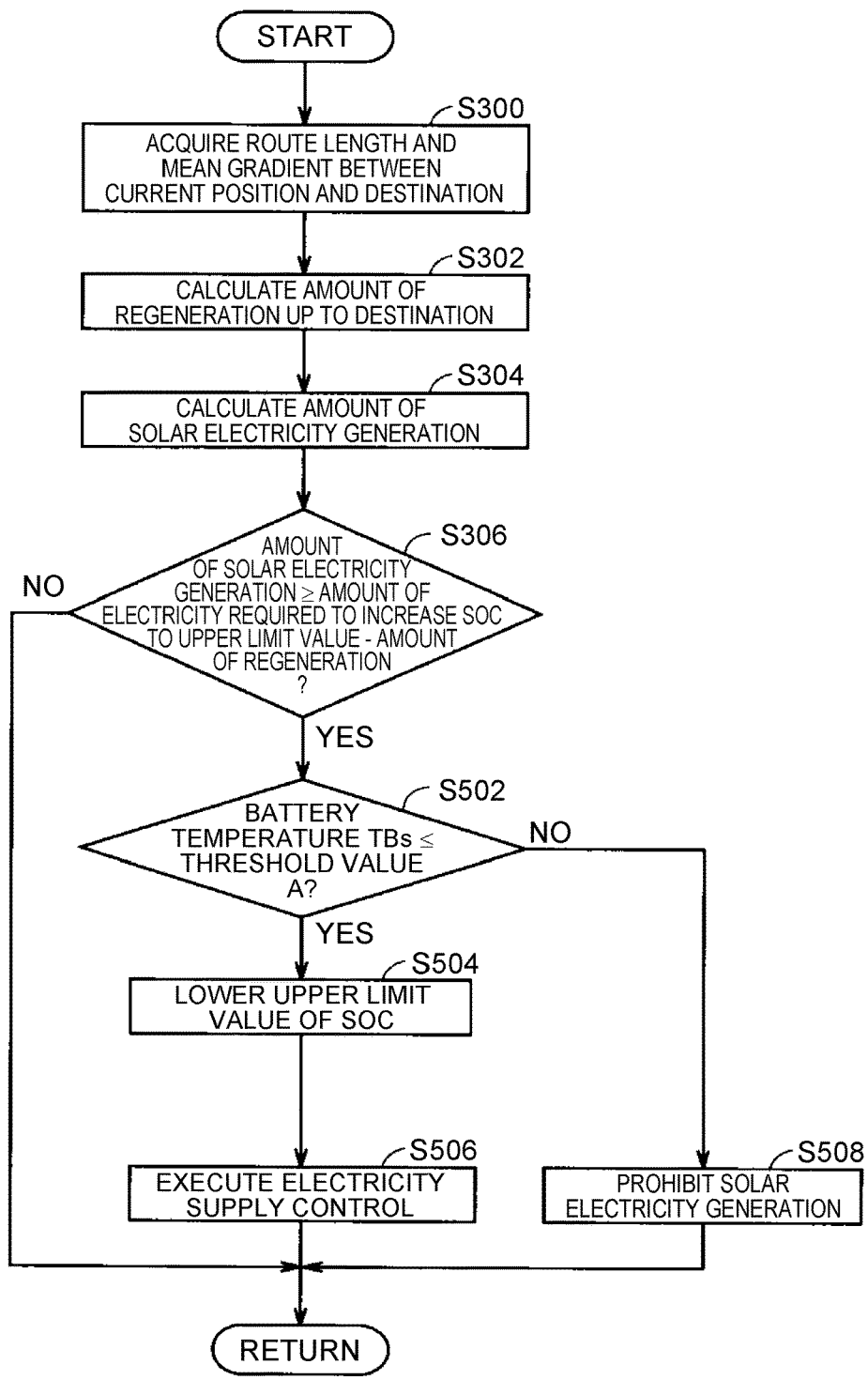
FIG. 10 is a flowchart (No. 6) showing a control process executed by the ECU in a modified example.

Alternatively, when the difference value is smaller than the estimated value of the amount of generated electricity generated by the solar panel 50, the ECU 100 may prohibit the solar electricity generation if the temperature of the solar battery 60 is higher than the threshold value A, and may lower the upper limit value of the SOC of the solar battery 60 if the temperature of the solar battery 60 is not higher than the threshold value A. In this modified example, the ECU 100 executes the processes shown in the flowchart of FIG. 10, for example. The processes of the flowchart shown in FIG. 10 are the same as those of the flowchart shown in FIG. 8, except that the process in S308 is substituted with the processes in S502, S504, S506, and S508. Moreover, the processes in S502, S504, S506, and S508 are the same as the processes in S102, S104, S106, and S108, respectively, of the flowchart shown in FIG. 3. Therefore, detailed description of the flowchart shown in FIG. 10 will be omitted.

Some or all of the modified examples described above may be implemented in combination as appropriate. The embodiment disclosed herein should be considered as not restrictive but merely illustrative in every respect. It is intended that the scope of the present disclosure is defined not by the above description but by the claims, and that all possible modifications equivalent in meaning and scope to the claims are included in the scope of the present disclosure.

What is claimed is:

1. An electric vehicle comprising:
a rotating electric machine;
a photovoltaic cell that converts energy of light into electricity;
a first electricity storage device that is charged with electricity output from the photovoltaic cell;
a second electricity storage device that is chargeable with electricity generated by the rotating electric machine, and serves as a power source for generating driving force of the vehicle; and
an electronic control unit that is configured to be able to execute at least one of first charge control of charging the second electricity storage device with electricity from the first electricity storage device, and second charge control of charging the second electricity storage device with generated electricity generated by the rotating electric machine, wherein
the electronic control unit is configured to either prohibit charging the first electricity storage device or lower an upper limit value of an SOC of the first electricity storage device while the control device is executing the second charge control.

2. The electric vehicle according to claim 1, wherein the electronic control unit is configured to prohibit charging the first electricity storage device when a temperature of the first electricity storage device is higher than a threshold value while the electronic control unit is executing the second charge control.

3. The electric vehicle according to claim 1, wherein the electronic control unit is configured to lower the upper limit value of the SOC of the first electricity storage device when a temperature of the first electricity storage device is lower than a threshold value while the electronic control unit is executing the second charge control.

4. The electric vehicle according to claim 1, further comprising an engine coupled to the rotating electric machine, wherein the electronic control unit is configured to make the rotating electric machine generate electricity using power from the engine while the control device is executing the second charge control.

5. The electric vehicle according to claim 4, wherein the electronic control unit is configured to execute the second charge control on demand from a user.

6. The electric vehicle according to claim 1, wherein
the rotating electric machine is coupled to a driving wheel, and
the electronic control unit is configured to either prohibit charging the first electricity storage device or lower the upper limit value of the SOC of the first electricity storage device, when a difference value obtained by subtracting, from an amount of electricity required to increase an SOC of the second electricity storage device from a current value to an upper limit value, an estimated value of an amount of electricity corresponding to an amount of increase in the SOC that is increased by regenerative energy generated by the rotating electric machine while the electric vehicle travels from a current position to a destination, is smaller than an estimated value of an amount of generated electricity generated by the photovoltaic cell during the travel.

* * * * *

UNITED STATES PATENT AND TRADEMARK OFFICE
CERTIFICATE OF CORRECTION

PATENT NO. : 10,351,011 B2  
APPLICATION NO. : 15/861162  
DATED : July 16, 2019  
INVENTOR(S) : Kazuki Kubo, Kiyohito Machida and Tsutomu Kawasaki Page 1 of 1

It is certified that error appears in the above-identified patent and that said Letters Patent is hereby corrected as shown below:

In the Specification

In Column 1, Line 32, delete "h" and insert --by-- therefor
In Column 2, Line 46, delete "that" and insert --first-- therefor
In Column 4, Line 26, delete "die" and insert --the-- therefor
In Column 5, Line 12, delete "tipper" and insert --upper-- therefor
In Column 6, Line 34, delete "ECU" and insert --PCU-- therefor
In Column 6, Line 35, delete "ECU" and insert --PCU-- therefor
In Column 6, Line 42, delete "ECU 40" and insert --PCU 40-- therefor
In Column 6, Line 51, delete "ECU 40" and insert --PCU 40-- therefor
In Column 7, Line 20, delete "FEU" and insert --ECU-- therefor
In Column 8, Line 48, after "vehicle 1" insert --(e.g.,-- therefor
In Column 8, Line 65, delete "h" and insert --by-- therefor
In Column 9, Line 47, delete "SOC_n (0)" and insert --SOC_u (0)-- therefor
In Column 9, Line 53, delete "SOC$_{13}$u (1)" and insert --SOC_u (1)-- therefor
In Column 11, Line 27, after "charging" delete ","
In Column 11, Line 42, after "charging" delete ","
In Column 12, Line 14, delete "far" and insert --for-- therefor
In Column 12, Line 58, after "temperature" delete "."
In Column 14, Line 19, after "calculates" delete ","

Signed and Sealed this  
Third Day of September, 2019

Andrei Iancu  
*Director of the United States Patent and Trademark Office*